United States Patent
Candelore et al.

(10) Patent No.: US 11,460,998 B2
(45) Date of Patent: Oct. 4, 2022

(54) ACCESSIBILITY FOR DIGITAL DEVICES

(71) Applicant: Sony Corporation, Tokyo (JP)

(72) Inventors: Brant Candelore, Poway, CA (US);
Mahyar Nejat, La Jolla, CA (US);
Robert Blanchard, Escondido, CA (US); Peter Shintani, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/386,164

(22) Filed: Apr. 16, 2019

(65) Prior Publication Data
US 2020/0333933 A1    Oct. 22, 2020

(51) Int. Cl.
| | | |
|---|---|---|
| G06F 3/048 | (2013.01) | |
| G06F 3/0487 | (2013.01) | |
| G06F 9/451 | (2018.01) | |
| G06F 3/0482 | (2013.01) | |
| G06F 3/16 | (2006.01) | |

(52) U.S. Cl.
CPC .......... *G06F 3/0487* (2013.01); *G06F 3/0482* (2013.01); *G06F 3/16* (2013.01); *G06F 9/453* (2018.02)

(58) Field of Classification Search
CPC .......... G06F 3/162; G06F 3/016; G06F 3/048; G06F 3/0487; G06F 9/453; G06F 3/0482; G06F 3/16; G06F 3/167; H04N 21/41; H04N 21/42; H04N 21/43
See application file for complete search history.

(56) References Cited

U.S. PATENT DOCUMENTS

| | | | | |
|---|---|---|---|---|
| 5,311,175 | A * | 5/1994 | Waldman | G06F 3/023 379/88.16 |
| 7,979,805 | B2 * | 7/2011 | Liu | G06F 3/04895 715/772 |
| 9,507,561 | B2 * | 11/2016 | Mckiel, Jr. | G06F 3/04883 |
| 9,720,640 | B2 * | 8/2017 | Pedersen | A63H 5/00 |
| 9,959,782 | B1 | 10/2018 | Candelore et al. | |

(Continued)

FOREIGN PATENT DOCUMENTS

KR    10026159981    5/2000

OTHER PUBLICATIONS

Axon Flex 2 Quick Start Guide "Link 1: https://prismic-io.s3.amazonaws.com/tasr%2Ff5d6fbb1-6efa-469b-b71c-64660dc30675_axon_flex_2_quick_start_c.pdfLink 2: https//help.axon.com/hc/en-us/articles/115001359673-Audio-prompt-and-vibration-guide" "Recording The Axon Flex 2 system has 2 operating modes. The default mode, or BUFFERING mode, provides pre-event buffering to capture activities that occur before you activate the EVENT (recording) mode."; 2017—2 pages.

*Primary Examiner* — Mahelet Shiberou
(74) *Attorney, Agent, or Firm* — Trellis IP Law Group, PC (57) ABSTRACT

Implementations generally relate to improving accessibility for digital devices. In some implementations, a method includes receiving a first selection of at least one button of a plurality of buttons of a user interface. The method further includes determining a type of the first selection based on one or more button selection characteristics. The method further includes determining a first command based at least in part on the type of the first selection. The method further includes providing an audible indication corresponding to the first command, wherein the audible indication indicates button information.

16 Claims, 7 Drawing Sheets

(56) References Cited

U.S. PATENT DOCUMENTS

| | | | |
|---|---|---|---|
| 10,264,206 B1* | 4/2019 | Candelore | H04N 21/42222 |
| 2002/0146250 A1 | 10/2002 | Stockton et al. | |
| 2003/0234824 A1* | 12/2003 | Litwiller | G09B 21/006 |
| | | | 715/865 |
| 2006/0061553 A1* | 3/2006 | Korhonen | G06F 3/023 |
| | | | 345/168 |
| 2007/0139226 A1* | 6/2007 | Morris | G06F 3/016 |
| | | | 341/27 |
| 2008/0126975 A1* | 5/2008 | Vassigh | G06F 3/0219 |
| | | | 715/772 |
| 2008/0300016 A1* | 12/2008 | Nickel | G06F 3/0416 |
| | | | 704/258 |
| 2009/0089856 A1* | 4/2009 | Bangor | H04B 1/202 |
| | | | 725/151 |
| 2011/0140847 A1* | 6/2011 | Schafer | G08C 23/04 |
| | | | 340/7.51 |
| 2012/0214436 A1* | 8/2012 | Clark | H04W 4/90 |
| | | | 455/404.2 |
| 2013/0287217 A1* | 10/2013 | Lee | G10K 11/178 |
| | | | 381/71.1 |
| 2015/0054733 A1* | 2/2015 | Pedersen | A63H 5/00 |
| | | | 345/156 |
| 2015/0106104 A1* | 4/2015 | Son | G08C 17/02 |
| | | | 704/270 |
| 2017/0235412 A1* | 8/2017 | Cheong | G06F 3/021 |
| | | | 345/173 |
| 2018/0225070 A1* | 8/2018 | Sugiyama | G06F 3/1242 |
| 2018/0275756 A1* | 9/2018 | Rai | H04N 21/00 |
| 2020/0192530 A1* | 6/2020 | Masri | G06F 3/04845 |

* cited by examiner

ACCESSIBILITY FOR DIGITAL DEVICES

BACKGROUND

Electronic devices typically have user interfaces with buttons for operating such devices. For example, buttons of a user interface on a digital device may enable a user to turn on the device, capture images, control picture settings, indicate where to store images, etc. The buttons on some electronic devices can be too small, making it difficult for some users to read physical labels. In bright lighting, buttons on a touch screen might be washed out and thus not visible. As such, it may be difficult for a user to know what button is being pressed and to know the purpose of a button.

SUMMARY

Implementations generally relate to improving accessibility for digital devices. In some implementations, a digital device includes one or more processors, and includes logic encoded in one or more non-transitory computer-readable storage media for execution by the one or more processors. When executed, the logic is operable to cause the one or more processors to perform operations including receiving a first selection of at least one button of a plurality of buttons of a user interface; determining a type of the first selection based on one or more button selection characteristics; determining a first command based at least in part on the type of the first selection; and providing an audible indication corresponding to the first command, where the audible indication indicates button information.

With further regard to the digital device, in some implementations, the logic when executed is further operable to cause the one or more processors to perform operations including: receiving a second selection of the at least one button; determining a type of the second selection based on the one or more button selection characteristics; determining a second command based at least in part on the type of the second selection; and executing the second command. In some implementations, the at least one button is a physical button. In some implementations, the at least one button is a touch-screen button. In some implementations, the one or more button selection characteristics include one or more of a quantity and a duration. In some implementations, the logic when executed is further operable to cause the one or more processors to perform operations including indicating a status of a device in response to the at least one button being selected. In some implementations, the logic when executed is further operable to cause the one or more processors to perform operations including performing noise cancellation during a recording by a device.

In some embodiments, a non-transitory computer-readable storage medium with program instructions thereon is provided. When executed by one or more processors, the instructions are operable to cause the one or more processors to perform operations including receiving, at a digital device, a first selection of at least one button of a plurality of buttons of a user interface; determining a type of the first selection based on one or more button selection characteristics; determining a first command based at least in part on the type of the first selection; and providing an audible indication corresponding to the first command, where the audible indication indicates button information.

With further regard to the computer-readable storage medium, in some implementations, the instructions when executed are further operable to cause the one or more processors to perform operations including: receiving a second selection of the at least one button; determining a type of the second selection based on the one or more button selection characteristics; determining a second command based at least in part on the type of the second selection; and executing the second command. In some implementations, the at least one button is a physical button. In some implementations, the at least one button is a touch-screen button. In some implementations, the one or more button selection characteristics include one or more of a quantity and a duration. In some implementations, the instructions when executed are further operable to cause the one or more processors to perform operations including indicating a status of a device in response to the at least one button being selected. In some implementations, the instructions when executed are further operable to cause the one or more processors to perform operations including performing noise cancellation during a recording by a device.

In some implementations, a method includes receiving, at a digital device, a first selection of at least one button of a plurality of buttons of a user interface; determining a type of the first selection based on one or more button selection characteristics; determining a first command based at least in part on the type of the first selection; and providing an audible indication corresponding to the first command, where the audible indication indicates button information.

With further regard to the method, in some implementations, the method further includes: receiving a second selection of the at least one button; determining a type of the second selection based on the one or more button selection characteristics; determining a second command based at least in part on the type of the second selection; and executing the second command. In some implementations, the at least one button is a physical button. In some implementations, the at least one button is a touch-screen button. In some implementations, the one or more button selection characteristics include one or more of a quantity and a duration. In some implementations, the method further includes indicating a status of a device in response to the at least one button being selected.

A further understanding of the nature and the advantages of particular implementations disclosed herein may be realized by reference of the remaining portions of the specification and the attached drawings.

DETAILED DESCRIPTION

Implementations described herein improve accessibility for digital devices. As described in more detail herein, implementations improve accessibility for digital devices by providing audible feedback to the user to identify buttons and describe functions of particular buttons.

In some implementations, a system receives a first selection of a button of a user interface. As described in more detail herein, the system may be a digital device such as a camera, etc. The system determines the type of the first selection based on one or more button selection characteristics. For example, the system may determine if the selection was based on a single press, a double press, a long press, etc. The system determines a first command based at least in part on the type of the first selection. The method further includes providing an audible indication corresponding to the first command, where the audible indication indicates button information. In various implementations, the button information may entail the name of the button and/or a description of the functionality associated with the button.

Figure 1:
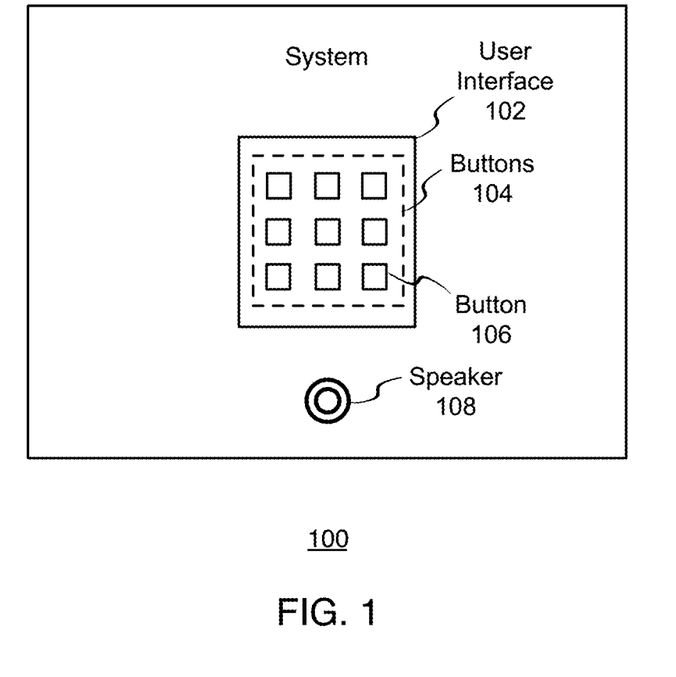
FIG. 1 illustrates a block diagram of an example system, which may be used for some implementations described herein.

FIG. 1 illustrates a block diagram of an example system 100, which may be used for some implementations described herein. In some implementations, system 100 includes a user interface 102 with control buttons, or buttons 104. Buttons 104 include button 106, among other buttons. System 100 also includes a speaker 108.

As shown, buttons 104 are a part of user interface 102, which is integrated into system 100. System 100 may be any system or device controllable by and/or configured by buttons 104 of user interface 102, depending on the particular implementation. For example, system 100 may be a television, camera, or any other digital imaging device, media device, etc. System 100 may be a coffee maker, refrigerator, etc., or any other appliance, etc. System 100 may be headphones, pedometer, watch, etc., or any other small mobile device.

As described in more detail herein, implementations improve accessibility for digital devices by providing audible feedback to the user to identify functions of particular buttons. In various implementations, a user may select one or more buttons 104 such as button 106 to control and/or configure system 100. Buttons 104 may represent various different types of control buttons. The particular types of buttons may vary, depending on the particular implementation. For example, buttons 104 may be used for controlling system 100, and/or for configuring settings (e.g., preferences, alarm clock, etc.), etc. In some implementations, the buttons may be physical buttons. The physical buttons may be ones that provide a momentary contact closure or ones that provide persistent contact closure. Alternatively, some buttons may be soft buttons or touchscreen buttons.

For ease of illustration, nine buttons 104 and one speaker 108 are shown. There may be any number of buttons on user interface 102, and there may be any number of speakers integrated with and/or connected to system 100. In various implementations, system 100 may not have all of the components shown and/or may have other elements including other types of components instead of, or in addition to, those shown herein. In various implementations, the buttons may be grouped or displayed in different configurations, depending on the particular implementation.

As indicated above, buttons 104 are a part of user interface 102, which is integrated into system 100. Example embodiments directed to buttons on a digital device are described in more detail below in connection with FIG. 2.

Figure 2:
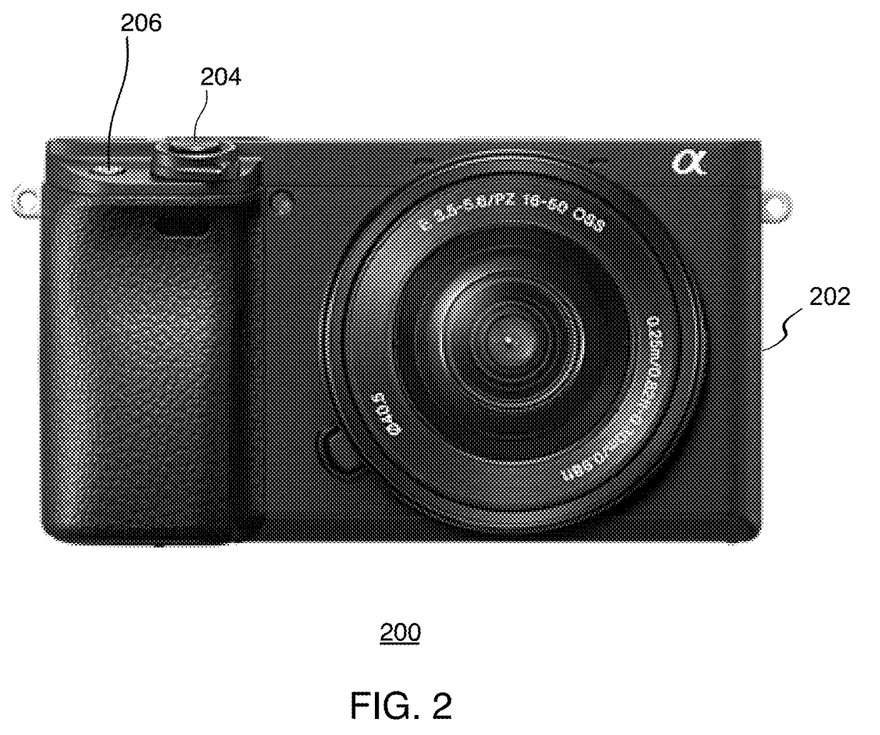
FIG. 2 is a front view of an example digital device, according to some implementations.

FIG. 2 is a front view of an example digital device 200, according to some implementations. In this particular implementation, digital device 200 is a camera. In various implementations, the digital device 200 may also include one or more internal (not shown) processors, computer memories, and wireless receivers such as infrared (IR) command receivers, or Bluetooth transceivers, or WWI transceivers to control a device (e.g., a camera, a speaker, a television, etc.) along with the physical or soft buttons.

While implementations below are described in the context of buttons on a digital camera, these implementations may also apply to buttons on other digital imaging devices, clocks and watches, radios, media devices, appliances, etc. As with the example buttons of FIG. 1, the system improves accessibility for digital devices by providing audible feedback to the user to identify functions of particular buttons. As shown, digital device 200 includes a typically plastic, hand-holdable housing 202 with multiple input keys that can be manipulated by a person.

As shown, digital device 200 includes some standard control buttons such as buttons 204 and 206. In this particular implementation, button 204 is a power button, and button 206 is a shutter button. The particular number of buttons may vary, and will depend on the particular implementation. In various implementations, digital device 200 may not have all of the components shown and/or may have other elements including other types of components instead of, or in addition to, those shown herein.

Figure 3:
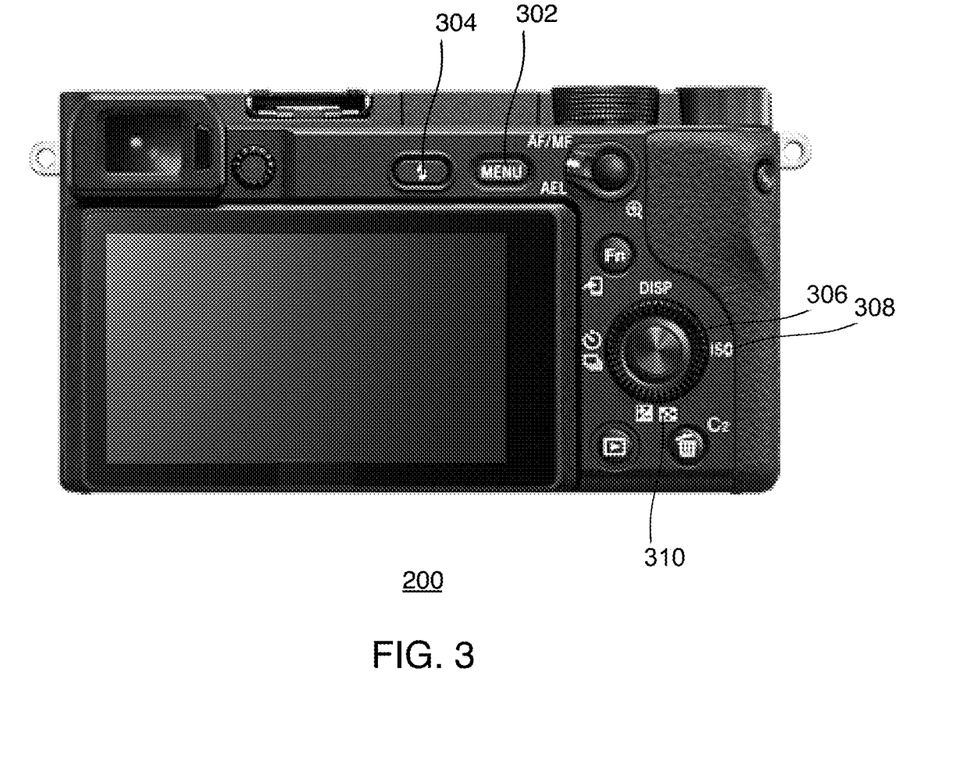
FIG. 3 is a rear view of the example digital device of FIG. 2, according to some implementations.

FIG. 3 is a rear view of example digital device 200 of FIG. 2, according to some implementations. Shown are various buttons, which provide momentary contact closure such as a menu button 302 (labeled "MENU") and a flash button 304 (labeled with a flash symbol), etc. Due to limited real estate space, digital device 200 may include one or more control dial buttons, which provide constant contact closure, such as dial 306, which includes various selections such as an International Organization of Standardization selection 308 (labeled "ISO"). ISO measures the sensitivity of the image sensor. Dial also includes a brightness/contrast selection 310 (labeled with brightness and contrast symbols). The particular selections on dial 306 and the number of selections may vary, and will depend on the particular implementation.

The particular number of buttons may vary, and will depend on the particular implementation. In various implementations, digital device 200 may not have all of the components shown and/or may have other elements including other types of components instead of, or in addition to, those shown herein.

As shown, many other buttons and dials may also be provided, making the task for a person, especially with a vision impairment, to learn the functions of the keys daunting. As described in more detail herein, the system makes controls and associated functions accessible on digital device 200 by providing audible descriptions of various lengths and levels of detail to the user. This enables the user to better understand and more quickly learn the manipulate the various controls on digital device 200.

Figure 4:
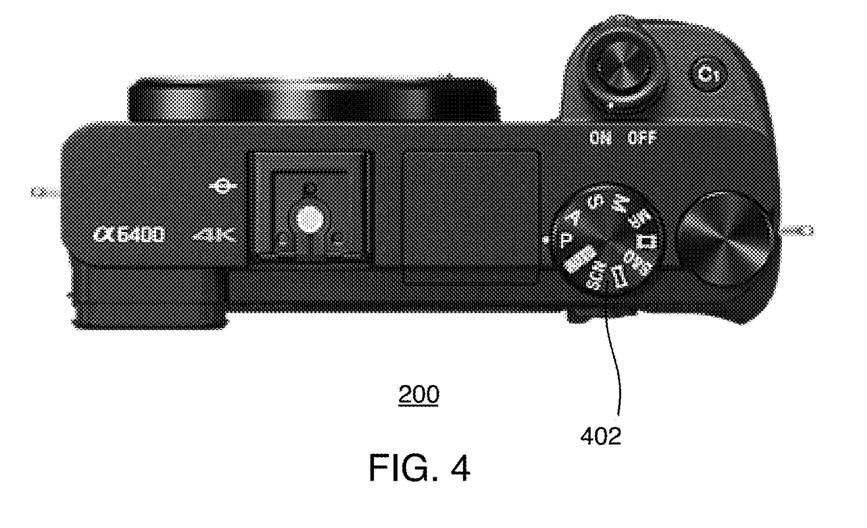
FIG. 4 is a top view of the example digital device of FIG. 2, according to some implementations.

FIG. 4 is a top view of example digital device 200 of FIG. 2, according to some implementations. Similar to FIG. 3, due to limited real estate space, digital device 200 may include one or more rotary control dials, that make constant contact connections, such as dial 402, which includes various buttons labeled with various letters (e.g., "M," "S," etc.). This top view is another example implementation, where the task for a person, especially with a vision impairment, to learn the functions of the keys daunting.

Figure 5:
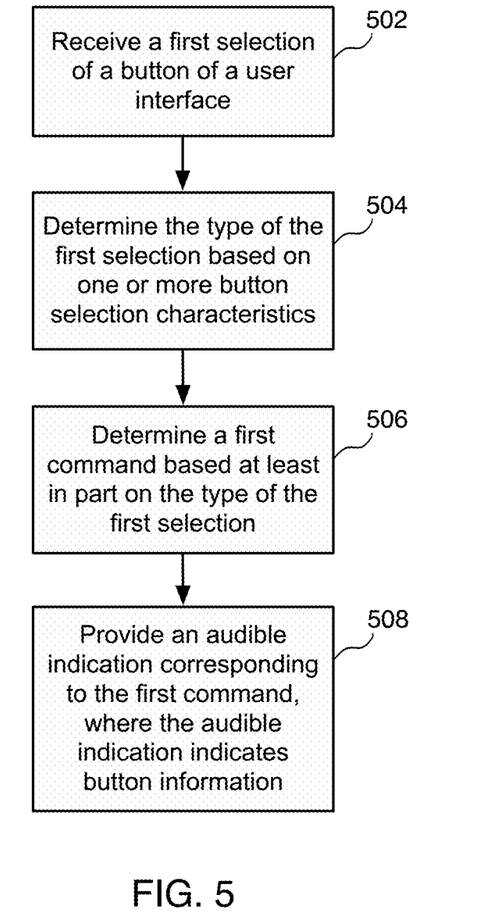
FIG. 5 is an example flow diagram for improving accessibility for digital devices, according to some implementations.

FIG. 5 is an example flow diagram for improving accessibility for digital devices, according to some implementations. As described in more detail herein, implementations improve accessibility for digital devices by providing audible feedback to the user to identify functions of particular buttons. Referring to both FIGS. 1 and 3, a method is initiated at block 502, where the system receives a first selection of a button such as button 106 of buttons 104 of user interface 102.

At block 504, the system determines the type of the first selection based on one or more button selection characteristics (e.g., that make momentary contact closure or constant contact closure). In some implementations, the button selection characteristics may include characteristics associated with how the particular button was selected. In some implementations, the button selection characteristics may include quantity, and/or duration, etc. For example, in some embodiments, the button, such as button 106, a button that provides momentary contact closure, may be selected by a single press, a double press, a long press, etc. In some implementations, the system may determine a duration that a given button is pressed. For example, the system may determine whether a single press is a short single press or a long single press. A short single press may be less than a predetermined time period that the button is pressed (e.g., less than 0.5 seconds, less than 1.0 seconds, etc. A single long press may be greater than a predetermined time period that the button is pressed (e.g., greater than 0.5 seconds, greater than 1.0 seconds, etc. Example embodiments directed to types of button selections are described in more detail below.

In some implementations, the system may provide an audible sound that indicates that the user has pressed a particular button long enough to be rendered a long press. For example, if the user presses a given button for a predetermined time period (e.g., 1 second, 1.5 seconds, 2 seconds, etc.), the system may render the single press a long press. The system may provide an audible tone to indicate a long press.

At block 506, the system determines a first command based at least in part on the type of the first selection. In various implementations, the system may map the type of first selection to a first or initial command. Such mappings may be predetermined. For example, in some implementations, if the user gives the given button a single short press, the system may determined that a single short press is corresponds to a command to effectuate or actuate the button. If the user initially gives the given button a single long press, the system may determined that the single long press is corresponds to command to provide an audible description of the button. In some implementations, the audible description of the button may be a label such as an audible word or phrase that briefly identifies the button (e.g., "ISO," "brightness/contrast," etc.). The system may determine that a subsequent or second single short press corresponds to a command to actuate the button.

In some implementations, the system may be associated multiple commands with a single selection. For example, if the user gives a given button a single short press, the system may determine one command associated with the single short press is to effectuate a command associated with the button, and another command may be to provide an audible description of the button. In this particular implementation, the system may perform both commands substantially simultaneously and/or in a predetermined order. This would be the case for buttons providing constant contact closure. The manipulation of such buttons, e.g., rotary dial button, could cause, for instance, an announcement of the button and also execution or enablement of the function associated with the button.

The particular commands associated with a particular type of the first selection may vary and will depend on the particular implementation. For example, in some implementations, if the user gives a given button a single short press, the system may map the type of the first selection (e.g., single short press) to a first or initial command, and the system may determine that the first command is to audibly provide the user with a label. Such a label may be an audible word or phrase that briefly identifies the button (e.g., "channel 10," "menu," etc.).

In another example, in some implementations, if the user gives a given button another type of first selection (e.g., single long press) to a first or initial command, the system may determine that the first command is to audibly provide the user with a more detailed functional description of the button. Such a functional description may be one or more sentences. For example, the system may audibly announce via a speaker, "This button effectuates the display of a home menu." The particular words or description may vary, and will depend on the particular implementation.

In another example, in some implementations, if the user gives a given button another type of first selection (e.g., a double press) to a first or initial command, the system may determine that the first command is to actuate the button (e.g., changing the channel, changing the volume, display a particular menu, etc.).

At block 508, the system provides an audible indication corresponding to the first command, where the audible indication indicates button information. For example, in some embodiments, if the user gives a particular button a single short press, the system may actuate the button. If the user gives the button a single long press, the system may audibly provide the user with a label. Such a label may be an audible word or phrase that briefly identifies the button, as indicated in examples above. If the user gives a particular button a second single long press, the system may audibly provide a longer description of the functionality of the button, as indicated in examples above. Other example implementations directed to multiple selections of the same button are described in more detail below. In various implementations, the system may change the language used to convey button information based on the region selected by the user.

Figure 6:
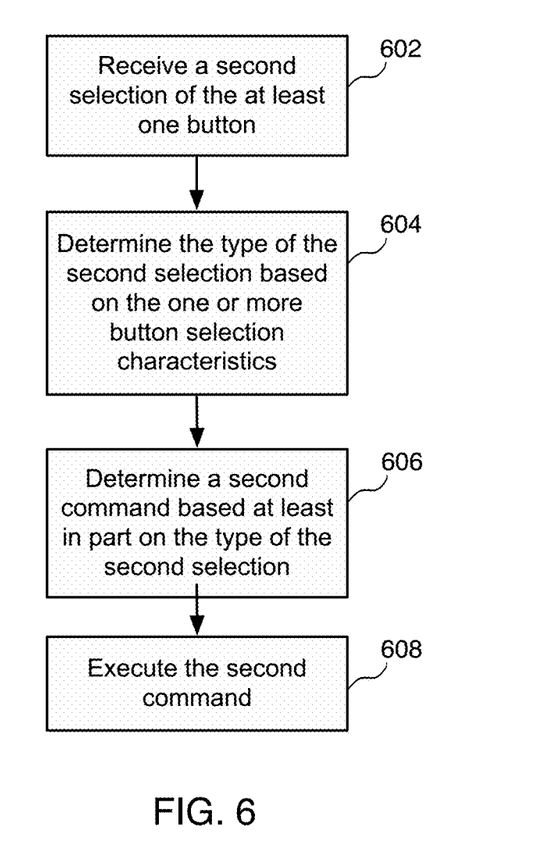
FIG. 6 is an example flow diagram for executing commands associated with buttons of digital devices, according to some implementations.

FIG. 6 is an example flow diagram for executing commands associated with buttons of digital devices, according to some implementations. Referring to both FIGS. 1 and 2, a method is initiated at block 602, where the system receives a second selection of at least one button of a user interface. For example, the user may make a first selection of a button (e.g., pressing the button with a first, single long press for an audible label). The user may then make a second selection of the button (e.g., pressing the button with a second, single long press for a longer audible description). The system may then make a third selection (e.g., a single, short press) to actuate the button. Further implementations directed to a second selection are described in more detail below.

At block 604, the system determines the type of the second selection based on the one or more button selection characteristics. For example, such a second selection may be a double press of the button.

At block 606, the system determines a second command based at least in part on the type of the second selection. For example, such a second command may be to actuate the button, where the system maps a first, single long press to a command to provide an audible description of the button, and may map a second, single short press to actuating the button. In an example scenario, the user may first select/press the button with a single short press, which may provide an audible labeling of the button. The user may then select/press the same button with a double press, which may then actuate the button.

At block 608, the system executes the second command. In some implementations, the system indicates the status of the system (e.g., media device, digital imaging device, etc.) in response to the at least one button being selected. In some implementations, buttons when selected make audible sounds describing the status of the digital imaging device. In some implementations, the system may indicate the status with the use of a separate status button that describes what process or processes the system (e.g., camera) is performing. If the user double presses the status button, the system may effectuate the button by reciting the status of the device. For example, the status of the system may be one of the following, "recording," "focusing," "zooming," "zoomed at 12 times," "light setting is 3," "aperture is 5.6." In some implementations, the system may have a separate audio-out jack for connecting to a speaker for producing an audible status of the system. In some implementations, the system may have a separate mechanism for providing haptic feedback (e.g., vibrations, etc.) to the user.

In some implementations, the system performs noise cancellation during a recording by the system or device. For example, in some implementations, the system may limit the button noise from being recorded along with any audio recording.

In some implementations, the system may determine particular modes of the system. For example, the system may determine if it is in a cellphone mode, a camera mode, camcorder/video mode, etc. In some implementations, the system may respond to particular button selections and types of button selections based at least in part on the mode. For example, in some implementations, the system if in video mode where audio is being recorded, may allow an audible button description when the video is not recording. In some implementations, the system may apply noise-cancelling techniques in order to enable audible button descriptions and yet not interfere with any audio recording.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations enable a user who has difficulty reading control buttons to know the function or functions of particular buttons. Implementations described herein also enable a user to know the functionality of particular buttons based on audible descriptions.

Figure 7:
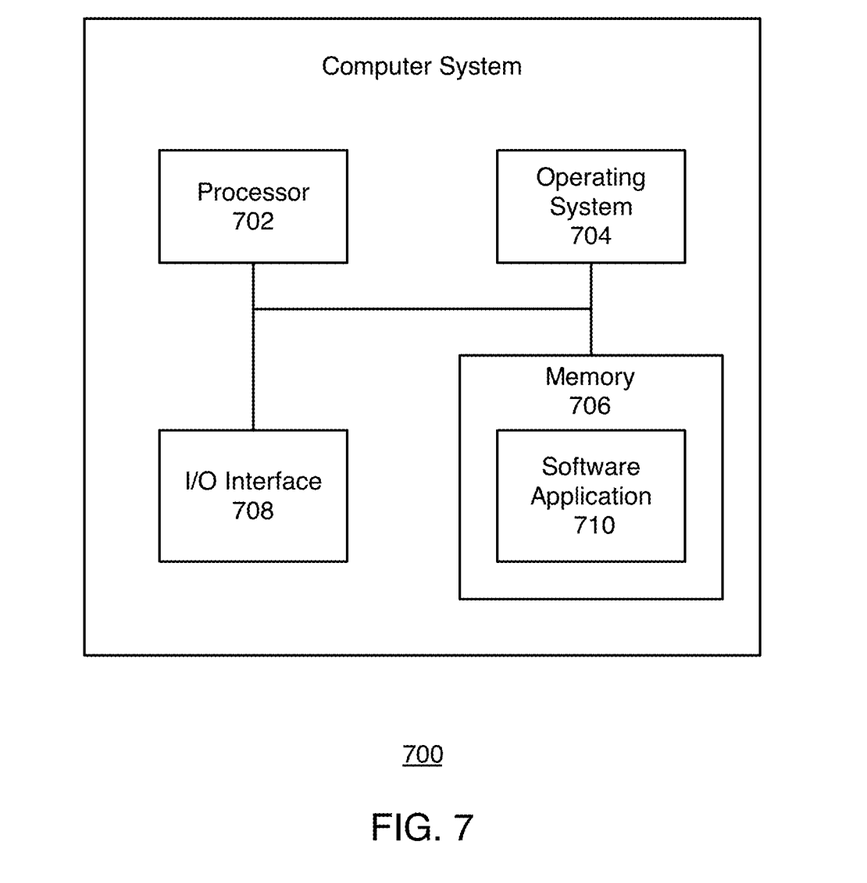
FIG. 7 is a block diagram of an example computer system, which may be used for some implementations described herein.

FIG. 7 is a block diagram of an example computer system 700, which may be used for some implementations described herein. For example, computer system 700 may be used to implement system 100 of FIG. 1, as well as to perform implementations described herein. In some implementations, computer system 700 may include a processor 702, an operating system 704, a memory 706, and an input/output (I/O) interface 708. In various implementations, processor 702 may be used to implement various functions and features described herein, as well as to perform the method implementations described herein. While processor 702 is described as performing implementations described herein, any suitable component or combination of components of computer system 700 or any suitable processor or processors associated with computer system 700 or any suitable system may perform the steps described. Implementations described herein may be carried out on a user device, on a server, or a combination of both.

Computer system 700 also includes a software application 710, which may be stored on memory 706 or on any other suitable storage location or computer-readable medium. Software application 710 provides instructions that enable processor 702 to perform the implementations described herein and other functions. Software application may also include an engine such as a network engine for performing various functions associated with one or more networks and network communications. The components of computer system 700 may be implemented by one or more processors or any combination of hardware devices, as well as any combination of hardware, software, firmware, etc.

For ease of illustration, FIG. 7 shows one block for each of processor 702, operating system 704, memory 706, I/O interface 708, and software application 710. These blocks 702, 704, 706, 708, and 710 may represent multiple processors, operating systems, memories, I/O interfaces, and software applications. In various implementations, computer system 700 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A digital device comprising:
one or more processors; and
logic encoded in one or more non-transitory computer-readable storage media for execution by the one or more processors and when executed operable to cause the one or more processors to perform operations comprising:
receiving a first selection of at least one button of a plurality of buttons of a user interface;
determining a type of the first selection based on one or more button selection characteristics;
determining a first command based at least in part on the type of the first selection, wherein the first command is to provide an audible indication if the type of the first selection is a long press;
executing the first command, wherein the executing of the first command provides the audible indication corresponding to the first command, wherein the audible indication provides an audible tone indicating that the at least one button has been pressed long enough to be rendered a long press, and wherein the audible indication also provides an audible description of the button;
receiving a second selection of the at least one button, wherein the second selection of the at least one button is subsequent to the first selection, wherein the second selection of the at least one button is a second long press;
providing a description of a functionality of the at least one button based on the second selection;
receiving a third selection of the at least one button, wherein the third selection of the at least one button is subsequent to the second selection, wherein the second third selection of the at least one button is a single short press, and wherein the single short press actuates a command to actuate the at least one button;
performing noise cancellation if the digital device is recording; and
indicating a status of a device in response to the at least one button being selected.

2. The digital device of claim 1, wherein the logic when executed is further operable to cause the one or more processors to perform operations comprising:
receiving the third selection of the at least one button;
determining a type of the third selection based on the one or more button selection characteristics;
determining a third command based at least in part on the type of the second selection; and
executing the third command.

3. The digital device of claim 1, wherein the description of the functionality of the at least one button is audible.

4. The digital device of claim 1, wherein the at least one button is a touch-screen button.

5. The digital device of claim 1, wherein the one or more button selection characteristics comprise one or more of a quantity and a duration.

6. The digital device of claim 1, wherein the logic when executed is further operable to cause the one or more processors to perform operations comprising limiting button noise from being recorded along with any audio recording.

7. A non-transitory computer-readable storage medium with program instructions stored thereon, the program instructions when executed by one or more processors are operable to cause the one or more processors to perform operations comprising:
receiving, at a digital device, a first selection of at least one button of a plurality of buttons of a user interface;
determining a type of the first selection based on one or more button selection characteristics;
determining a first command based at least in part on the type of the first selection, wherein the first command is to provide an audible indication if the type of the first selection is a long press;
executing the first command, wherein the executing of the first command provides the audible indication corresponding to the first command, wherein the audible indication provides an audible tone indicating that the at least one button has been pressed long enough to be rendered a long press, and wherein the audible indication also provides an audible description of the button;

receiving a second selection of the at least one button, wherein the second selection of the at least one button is subsequent to the first selection, wherein the second selection of the at least one button is a second long press;

providing a description of a functionality of the at least one button based on the second selection;

receiving a third selection of the at least one button, wherein the third selection of the at least one button is subsequent to the second selection, wherein the third selection of the at least one button is a single short press, and wherein the single short press actuates a command to actuate the at least one button;

performing noise cancellation if the digital device is recording; and indicating a status of a device in response to the at least one button being selected.

8. The computer-readable storage medium of claim 7, wherein the instructions when executed are further operable to cause the one or more processors to perform operations comprising:

receiving the third selection of the at least one button;

determining a type of the third selection based on the one or more button selection characteristics;

determining a third command based at least in part on the type of the second selection; and executing the third command.

9. The computer-readable storage medium of claim 7, wherein the at least one button is a physical button.

10. The computer-readable storage medium of claim 7, wherein the at least one button is a touch-screen button.

11. The computer-readable storage medium of claim 7, wherein the one or more button selection characteristics comprise one or more of a quantity and a duration.

12. A computer-implemented method comprising:

receiving, at a digital device, a first selection of at least one button of a plurality of buttons of a user interface;

determining a type of the first selection based on one or more button selection characteristics;

determining a first command based at least in part on the type of the first selection, wherein the first command is to provide an audible indication if the type of the first selection is a long press;

executing the first command, wherein the executing of the first command provides the audible indication corresponding to the first command, wherein the audible indication provides an audible tone indicating that the at least one button has been pressed long enough to be rendered a long press, and wherein the audible indication also provides an audible description of the button;

receiving a second selection of the at least one button, wherein the second selection of the at least one button is subsequent to the first selection, wherein the second selection of the at least one button is a second long press;

providing a description of a functionality of the at least one button based on the second selection;

receiving a third selection of the at least one button, wherein the third selection of the at least one button is subsequent to the second selection, wherein the third selection of the at least one button is a single short press, and wherein the single short press actuates a command to actuate the at least one button;

performing noise cancellation if the digital device is recording; and indicating a status of a device in response to the at least one button being selected.

13. The method of claim 12, further comprising:

receiving the third selection of the at least one button;

determining a type of the third selection based on the one or more button selection characteristics;

determining a third command based at least in part on the type of the second selection; and executing the third command.

14. The method of claim 12, wherein the at least one button is a physical button.

15. The method of claim 12, wherein the at least one button is a touch-screen button.

16. The method of claim 12, wherein the one or more button selection characteristics comprise one or more of a quantity and a duration.

* * * * *